Dec. 17, 1929. C. E. A. O'LOUGHLIN 1,739,517
VEGETABLE PEELER
Filed Feb. 17, 1927

Inventor
Charles E. A. O'Loughlin
by his attorneys

Patented Dec. 17, 1929

1,739,517

UNITED STATES PATENT OFFICE

CHARLES E. A. O'LOUGHLIN, OF ST. PAUL, MINNESOTA

VEGETABLE PEELER

Application filed February 17, 1927. Serial No. 168,954.

This invention relates to a peeling and eye-cutting implement and particularly to such an implement comprising a gauge knife. In peeling vegetables such as potatoes, carrots and other vegetables, it is desirable to have an implement by means of which a vegetable can be easily and quickly peeled and by means of which eyes and bad spots may be easily and quickly removed. It is also deirable to have such an implement of simple and efficient construction and one which is comfortable and convenient in operation.

It is an object of this invention, therefore, to provide an implement having a knife portion and also comprising a portion adapted to remove eyes and bad spots in fruits or vegetables.

It is another object of the invention to provide an implement comprising a knife portion with a gauging means in proximity thereto and also comprising a substantially cylindrical portion for removing eyes, cores or bad spots from vegetables.

It is more specifically an object of the invention to provide an implement having a handle portion and a blade portion formed of one continuous strip of metal, said strip being formed into an eye removing portion and a gauging member for said blade.

These and other objects and advantages of the invention will be fully set forth in the following description made in connection with the accompanying drawings, in which like reference characters refer to similar parts throughout the several views and in which:—

Figure 1:
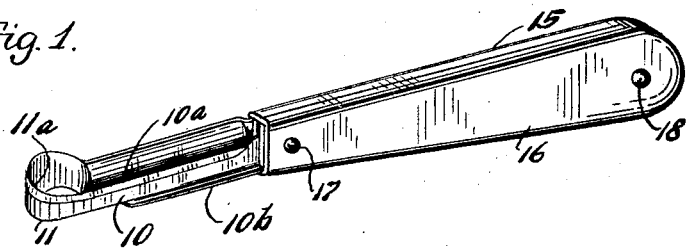
Fig. 1 is a perspective view of the device as seen from the blade side.
Figure 2:
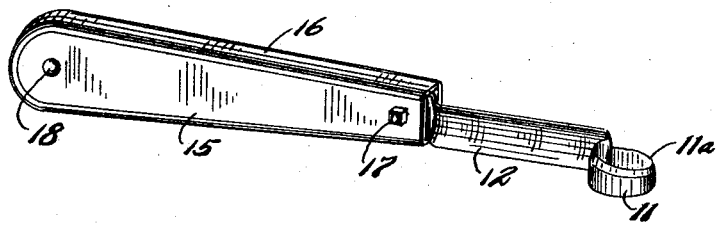
Fig. 2 is a perspective view of the device as seen from the gauge side.
Figure 3:
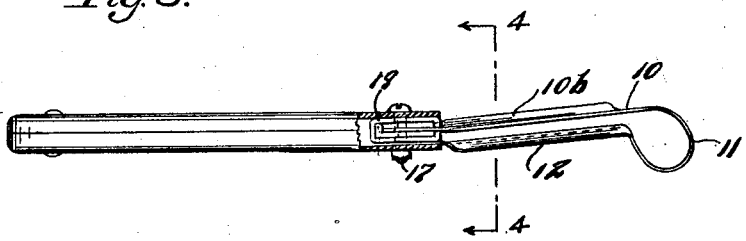
Fig. 3 is a view in side elevation of the device partly in section.
Figure 5:
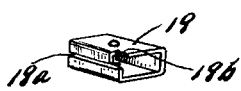
Fig. 5 is a perspective view of one part of the device.
Figure 4:
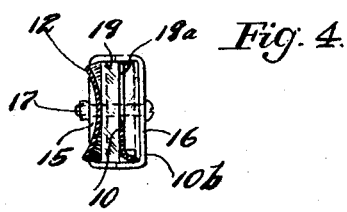
Fig. 4 is a vertical section taken on line 4—4 of Fig. 3.

Referring to the drawings, the device comprises a blade portion 10 of rectilinear form, said blade having a sharpened edge 10$^a$, and having extending along one edge thereof for the greater portion of its length, a narrow outwardly turned flange 10$^b$. The blade 10 merges at its outer end into a substantially cylindrical portion 11 of the tool which is also formed with an edge 11$^a$ continuous with the edge 10$^a$. From one end of the portion 11 a gauge portion 12 extends in continuous form from the portion 11, which gauge portion 12 is considerably wider than the blade portion 10 and is of convexo-concave form, having its convex side turned toward the blade 10. The portion 11 increases in width from the blade 10 to the gauge portion 12, as shown in Figs. 1 and 2. The blade portion 10 extends substantially tangent to the cylindrical portion 11, while the gauge portion 12 makes quite an angle with the side of the portion 11 as shown in Fig. 3. A holding member 19 is used, formed from a rectangular plate bent successively at right angles so as to form a substantially closed rectangle as shown in Fig. 5. The ends of the member 19 are separated slightly to form a space 19$^a$. The member 19 is disposed between and adjacent the ends of a pair of handle plates 15 and 16 having their outer ends rounded and tapering toward their inner ends, said plates being of trough or channel shape and of the same size so that their edges meet to form a closed casing. The member 19 is disposed with the space 19$^a$ at one end of the handle plates 15 and 16 and the blade 10 has its inner end extending into the space 19$^a$ of the member 19 and between the top and bottom sides of said member, the flange 10$^b$ extending to the end of the blade 10 and the member 19 having a cut away portion 19$^b$ to accommodate the flange 10$^b$. The inner end of the gauge member 12 extends between the member 19 and the plate 15 as shown in Fig. 3. A headed and nutted screw 17 passes through the plates 15 and 16 and both sides of the member 19, as well as the ends of the blade 10 and member 12, and all of these parts are thus tightly clamped together with the end of the handle. The ends of the members 10 and 12 are kept from any lateral movement by engaging the sides of the plates 15 and 16, the inner end of the plate 12 being widened so that it is substantially the same width as the member 19, as shown in Fig. 4.

In operation the implement is held in one hand and the vegetables or fruit in the other, and the fruit or vegetable is peeled by the knife 10, the member 12 acting as a gauge and determining the thickness of the peeling. The peeling passes between members 10 and 12 and out at one side of the device. Should it be desired to cut an eye from a potato or a bad spot from a vegetable, this can be quickly done by means of the cylindrical portion 11 which is sharpened on one edge. The piece or eye is quickly removed by a gouging and twisting movement with the portion 11. The portion 11 also forms a very convenient coring means when apples are pared, and it is only necessary to move the portion 11 longitudinally through the apple to remove the core. The portion 11 also forms a convenient means for making strips of potatoes such as used in making French fried potatoes. The portion 10$^b$ also acts as a guide for the peeling.

From the above description it is seen that applicant has provided a very simple and efficient peeling, eye cutting and coring implement and one which has great utility for the purpose intended. The device is extremely simple in construction, easily and inexpensively made, and yet is very durable. The same has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A peeling device comprising an implement having a handle, a peeling blade extending longitudinally from the handle and having at its outer end a substantially cylindrical eye-cutting and coring edged portion, said cylindrical portion having its axis extending parallel to the flat side of said blade and perpendicular to the longitudinal axis of said handle and blade.

2. A peeling and eye-cutting implement comprising a handle portion, a blade extending longitudinally from the handle portion, said blade being extended at its outer end to form a continuous substantially cylindrical eye cutting and coring portion substantially tangential at one side to said blade and a gauge member on said implement extending from said cylindrical portion to said handle and spaced slightly from said blade, said cylindrical portion having its axis extending at right angles to the length of said handle portion and blade and substantially parallel to the flat side of said blade.

3. A peeling and coring implement comprising a handle, a strip of material having its ends secured in said handle and having one end extending longitudinally from said handle, being edged to form a knife, said strip extending from said knife and being formed into a substantially cylindrical edged portion and extending from said cylindrical edged portion to said handle and spaced slightly from said blade to form a gauge member.

4. A peeling and coring implement having in combination, a strip of metal comprising a cutting portion, and having end portions, a plate bent into rectangular form having its end edges slightly separated, a pair of handle plates embracing said plate, said strip having one end portion disposed between said end edges and having its other end portion disposed between said plate and one of said handle plates, and means extending through said handle plates, said plate and the ends of said strip clamping said parts in fixed position.

5. The structure set forth in claim 4, said handle plates being channel shaped in cross section and the ends of said strip being disposed in said channels.

6. A peeling and coring implement comprising a handle, a strip of metal having its ends secured in said handle, one end extending longitudinally from said handle formed as a blade and being formed at its outer end into a substantially cylindrical portion constituting an eye-cutting tool, said strip extending inwardly from said cylindrical portion to said handle, parallel to said blade, said latter portion being concavo-convex in transverse cross section and having its convex side adjacent and spaced slightly from said blade to form a gauge member.

7. A peeling and eye-cutting implement comprising a handle portion, a blade extending longitudinally from said handle portion, a gauge member concavo-convex in transverse cross section extending parallel to said blade and having its convex side spaced slightly therefrom, and a substantially cylindrical eye cutting edge portion at the outer ends of said gauge member and blade having its ends connected respectively to said gauge member and blade and the axis of said cylindrical portion being parallel to the flat side of said blade and perpendicular to the longitudinal axis of said handle.

In testimony whereof I affix my signature.

CHARLES E. A. O'LOUGHLIN.